(12) United States Patent
Minore et al.

(10) Patent No.: US 7,711,740 B2
(45) Date of Patent: May 4, 2010

(54) DATA ACCESS LAYER DESIGN AND CODE GENERATION

(75) Inventors: Lorenzo Minore, Seattle, WA (US); Paul J Yuknewicz, Redmond, WA (US); Steven M Lasker, Sammamish, WA (US); Antoine Cote, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 507 days.

(21) Appl. No.: 10/968,734

(22) Filed: Oct. 19, 2004

(65) Prior Publication Data

US 2006/0085400 A1 Apr. 20, 2006

(51) Int. Cl.
*G06F 7/00* (2006.01)
(52) U.S. Cl. .................. 707/756; 707/763; 719/328; 717/106
(58) Field of Classification Search .............. 707/3, 707/103 R, 100, 103 Y, 104.1, 1; 717/106; 719/328
See application file for complete search history.

(56) References Cited

U.S. PATENT DOCUMENTS

| | | | | |
|---|---|---|---|---|
| 6,571,232 B1* | 5/2003 | Goldberg et al. | ............... | 707/2 |
| 7,020,660 B2* | 3/2006 | Woodring | ............... | 707/103 R |
| 2002/0013862 A1* | 1/2002 | Orchard et al. | .............. | 709/315 |
| 2003/0023609 A1* | 1/2003 | Della-Libera et al. | ....... | 707/101 |
| 2003/0120711 A1* | 6/2003 | Katz | ......................... | 709/106 |
| 2003/0233632 A1* | 12/2003 | Aigen et al. | ................. | 717/106 |
| 2004/0036719 A1* | 2/2004 | Van Treeck | ................. | 345/763 |
| 2004/0177066 A1* | 9/2004 | Igarashi | .......................... | 707/3 |
| 2004/0215604 A1* | 10/2004 | Ivanov | ........................... | 707/3 |
| 2005/0235258 A1* | 10/2005 | Wason | ........................ | 717/110 |

OTHER PUBLICATIONS

Sonia Bergamaschi et al., Object Wrapper: an Object-Oriented Interface for Relational Databases, IEEE, 1997.*
iBATIS Data Mapper Developer Guide, Oct. 6, 2004, pp. 1-68.*
Data Component Query Configuration Wizard, MSDN Visual Studio 2005 Library, 2004, 4 pages, http://msdn2.microsoft.com/library/6s413yfa.pf, last viewed Oct. 6, 2004.

(Continued)

*Primary Examiner*—Hosain T Alam
*Assistant Examiner*—Amy Ng
(74) *Attorney, Agent, or Firm*—Workman Nydegger

(57) ABSTRACT

A system and method that facilitate data access in a software development environment is provided. The system generates strongly typed objects that encapsulate raw, untyped data access logic and groups together like database commands in a common data access component. The system provides a mapping between database types and common language runtime data types including the impedance mismatch of null representations. The system configures data access component(s) that are employed at design-time to facilitate access to data object(s) by application(s) and allows a user of the configured data access component(s) to improve developer productivity and/or reduce the quantity of runtime errors introduced into code. The data access component can be instanced on multiple forms components and/or with the developer's own class(es). Thus, change(s) to a query and/or interface are accomplished within the data access component and be available to the forms components and/or object(s) that utilize the data access component.

16 Claims, 5 Drawing Sheets

OTHER PUBLICATIONS

Andrus Adamchik, Eric Schneider, Cayenne: Being Productive with Object Relational mapping; Jun. 2004, p. 1-11.*

Data Component Configuration Wizard, MSDN Visual Studio 2005 Library, 5 pages, http://msdn2.microsoft.com/library/dex7k4dw.pf, last viewed Oct. 6, 2004.

Robert Green, Walkthrough: Smart Client Data in Visual Basic 2005, MSDN Library, 19 pages, http://msdn.microsoft.com/library/en-us/dnvs05/html/smartclient_vb2005.asp?frame=true, last viewed Oct. 5, 2004.

* cited by examiner

DATA ACCESS LAYER DESIGN AND CODE GENERATION

TECHNICAL FIELD

The subject invention relates generally to software development tools, and more specifically, to a data access layer and code generation in a software development environment.

BACKGROUND OF THE INVENTION

Software vendors are continually advancing the latest in development tools for users to take advantage of software made available to consumers. Typically, such tools require some level of familiarity by developer with the tool(s) language and structure in order to use the development tool(s) and develop the appropriate interface. However, the rapid evolution in which such development frameworks are manufactured and sold impact the speed with which such tools can be understood and used to provide the software for which they are created. Developers are still left spending an inordinate amount of time learning and struggling with the development environment in order to provide a suitable product for a customer.

In convention system(s), developer(s) could leverage a set of wizards to configure Data Components such as the DataAdapter, DataCommand, and, DataConnection. These enabled a developer to have a configured component that enabled them to work with an updatable query of data. This ability enhanced the experience of having to write, for example, the SQL commands and glue the associated objects together. However, it still left the user with a limitation of working with an object that didn't expose the required information to execute it.

For example, to fill a Typed DataSet with a configured DataAdapter, developer(s) needed to know the parameter(s) and data type(s) the query required. The developer(s) were thus at a disadvantage in that they were working with object(s) that didn't expose the required information to execute it. For example, developers would need to know what parameter(s) and data type(s) a particular query required. There generally was no information that would guide the developer, nor would the developer receive any compile time verification that they provided the correct number and type of parameter values. Additionally, conventional system(s) did not support the ability to reuse the configured component(s) as the component(s) were configured and instanced where the component(s) were consumed.

In typical systems developers are guided down a path where they create individual commands that execute against the database. Developer(s) often required the ability to get the same result set of data with a different set of parameters. Developer(s) were often confused on how to create a set of common query commands and associate them with the associated updatable commands.

SUMMARY OF THE INVENTION

The following presents a simplified summary of the subject invention in order to provide a basic understanding of some aspects of the subject invention. This summary is not an extensive overview of the subject invention. It is not intended to identify key/critical elements of the subject invention or to delineate the scope of the subject invention. Its sole purpose is to present some concepts of the subject invention in a simplified form as a prelude to the more detailed description that is presented later.

The subject invention provides for a system and method that facilitate data access in a software development environment is provided. The system employs the ability to generate strongly typed objects (e.g., data access component(s)) that encapsulate raw, untyped data access logic, for example, via generated wrapped method(s). For example, the data access component can encapsulate a configured data adapter and expose public method(s) for the "Fill" and "Update" methods normally found on the untyped data classes. The invention pertains to creating strongly typed methods against an untyped data access library.

In accordance with an aspect of the subject invention, a system that facilitates data access is provided. The system includes a data access configuration component (e.g., configuration wizard) that configures data access component(s). The configured data access component(s) can be employed at design-time to facilitate access to data object(s) (e.g., database(s)) by application(s). The user of data access component(s) configured by the data access configuration component can, for example, dramatically improve developer productivity and/or reduce the quantity of runtime errors that are introduced into code.

In accordance with one example, the data access component is a generated class/type (e.g., TableAdapter). The data access component can be instanced on multiple forms components and/or with the developer's own class(es). Thus, change(s) to a query and/or interface can be accomplished within the data access component and be available to the forms components and/or object(s) that utilize the data access component.

To the accomplishment of the foregoing and related ends, certain illustrative aspects of the subject invention are described herein in connection with the following description and the annexed drawings. These aspects are indicative, however, of but a few of the various ways in which the principles of the subject invention may be employed and the subject invention is intended to include all such aspects and their equivalents. Other advantages and novel features of the subject invention may become apparent from the following detailed description of the subject invention when considered in conjunction with the drawings.

DETAILED DESCRIPTION OF THE INVENTION

Figure 1:
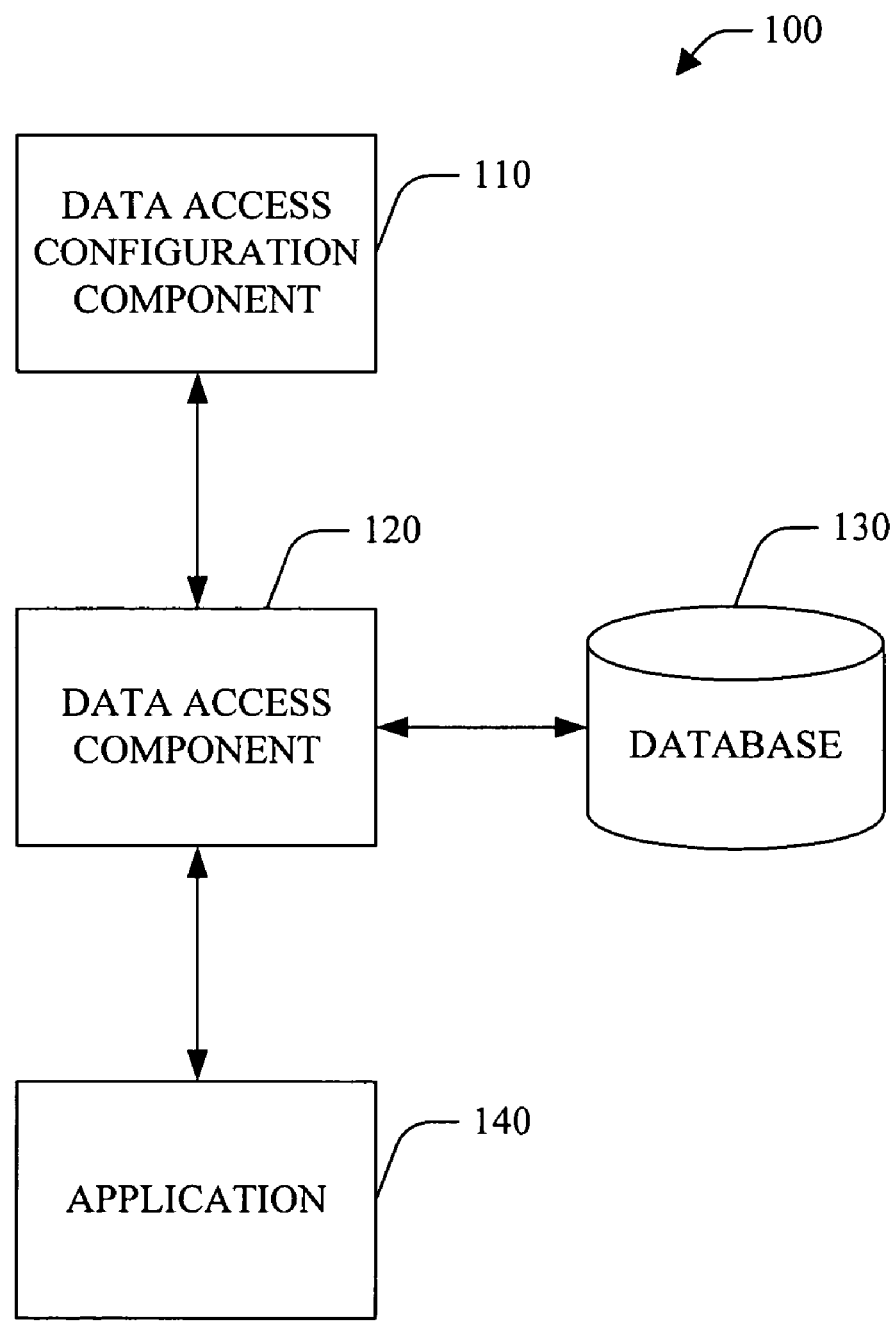
FIG. 1 is a block diagram of a system that facilitates data access in accordance with an aspect of the subject invention.

The subject invention is now described with reference to the drawings, wherein like reference numerals are used to refer to like elements throughout. In the following description, for purposes of explanation, numerous specific details are set forth in order to provide a thorough understanding of the subject invention. It may be evident, however, that the subject invention may be practiced without these specific details. In other instances, well-known structures and devices are shown in block diagram form in order to facilitate describing the subject invention.

As used in this application, the terms "component," "handler," "model," "system," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). Computer components can be stored, for example, on computer readable media including, but not limited to, an ASIC (application specific integrated circuit), CD (compact disc), DVD (digital video disk), ROM (read only memory), floppy disk, hard disk, EEPROM (electrically erasable programmable read only memory) and memory stick in accordance with the subject invention.

Referring to FIG. 1, a system 100 that facilitates data access in accordance with an aspect of the subject invention is illustrated. The system employs the ability to generate strongly typed objects (e.g., data access component(s) 120) that encapsulate raw, untyped data access logic, for example, via generated wrapped method(s). The invention thus pertains to creating strongly typed methods against an untyped data access library.

The system includes a data access configuration component 110 that configures data access component(s) 120. The configured data access component(s) 120 can be employed at design-time to facilitate access to a database 130 (e.g., database(s)) by application(s) 140.

The data access configuration component 110 can employ a data component query configuration wizard to create and/or edit a query of a data access component 120. In one example, the query can include any valid SQL query that returns either the same schema as the data component's data table or a scalar value. Completion of the wizard creates and/or modifies a named query on the selected data component's type data adapter 120. The query(ies) can be execution by calling method(s) on the data access component 120.

The data access configuration component 110 creates and/or modifies the data access component 120 with strongly-type method(s) used to fetch data from the database 130 (e.g., database) and/or fill an associated data table (not shown). The data access configuration component 110 can further create statement(s) (e.g., SQL) and/or stored procedures used to read and/or write data. Further, the data access configuration component 110 can create and/or configure parameter(s) for SQL statement(s) and/or stored procedure(s) so that the command(s) read and/or write the correct data. Thus, the data access configuration component 110 generates code to facilitate communication between the application 140 and the database 130.

Figure 2:
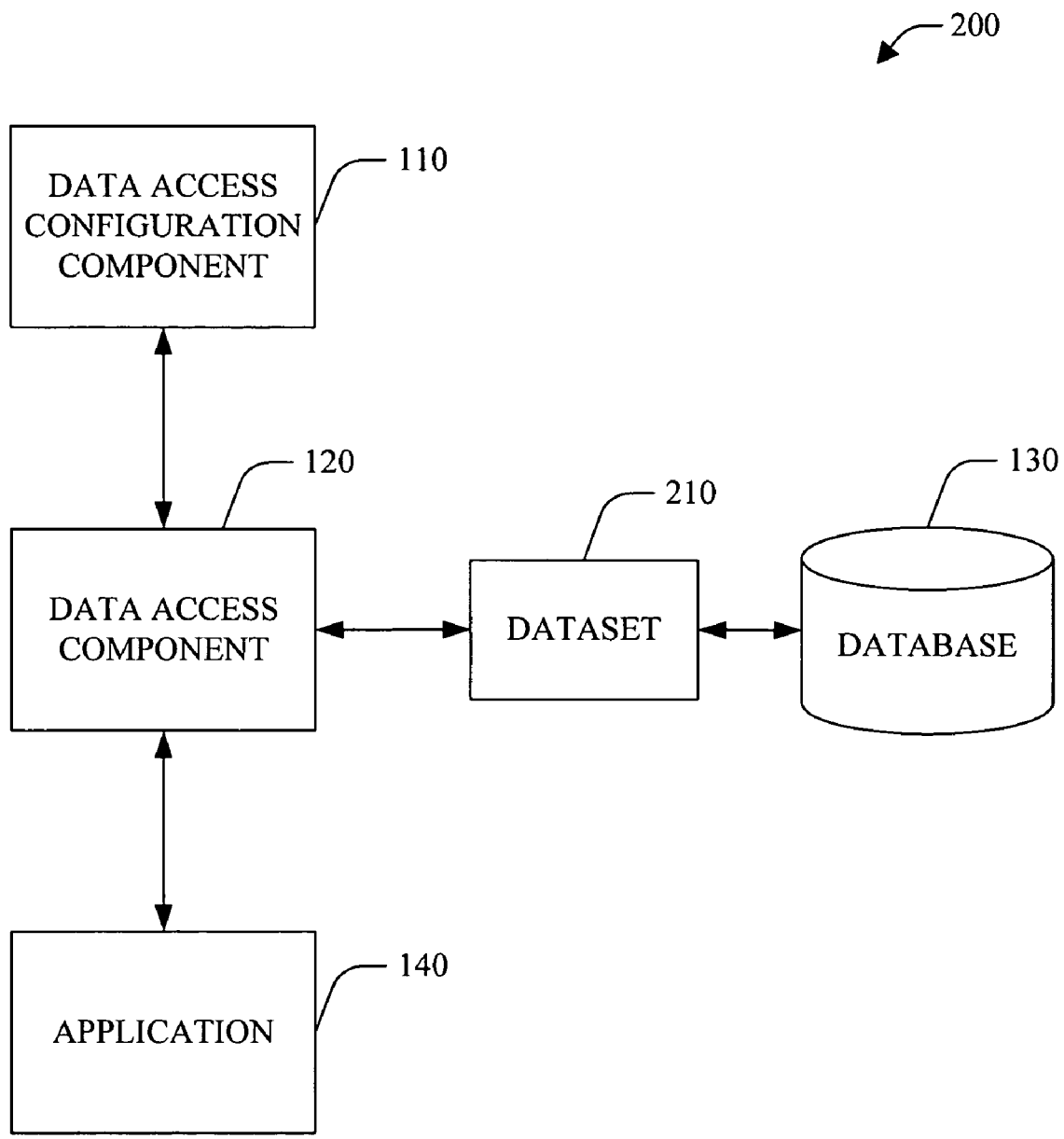
FIG. 2 is a block diagram of a system that facilitates data access in accordance with an aspect of the subject invention.

As noted previously, once a data access component 120 has been configured, query(ies) can be added, modified and/or deleted using the data access configuration component 110 (e.g., TableAdapter wizard). As shown in FIG. 2, the data access configuration component 110 can further create and/or modify a data set 210 associated with the database 130.

Referring back to FIG. 1, the user of data access component(s) 120 configured by the data access configuration component 110 can, for example, dramatically improve developer productivity and/or reduce the quantity of runtime errors that are introduced into code. For example, the data access component 120 can be a generated class/type. The data access component 120 can be instanced on multiple forms components and/or with the developer's own class(es). Thus, change(s) to a query and/or interface can be accomplished within the data adapter 120 and be available to the forms components and/or object(s) that utilize the data access component 120.

In one example, developer(s) conventionally wrote code as:

TABLE 1

Me.SqlDataAdapter1.SelectCommand.Parameters("CompanyName").
Value =
Me.CustomerNameTextBox.Text.Trim( ) & "%"
Me.SqlDataAdapter1.SelectCommand.Parameters("State").Value =
Me.StateComboBox.SelectedValue.Trim( )
Me.SqlDataAdapter1.Fill(Me.DataSet1.Customers)

Developer(s) using a data access component 120 configured by the system 100 can write the following code:

TABLE 2

Me.CustomerTableAdapter.FillByCompanyName(Me.NorthwindDataSet.
Customers, Me.CompanyNameTextBox.Text,
Me.StateComboBox.SelectedValue)

The data access component 120 can implement one or more named method(s) that can facilitate communication between the application 140 and the database 130 (e.g., database) and/or data set 210. The parameter(s) for the named method(s) are strongly typed. The data access component 120 encapsulates the communication between the application 140 and the database 130 and/or data set 210. The data access component 120 encapsulates a single configured data adapter and zero, one or more command(s) that can, for example, retrieve and/or update data based on a common schema. In one example, for each query available to execute against the database 130 (e.g., database) a method signature is generated. These method(s) can be called without knowledge of the specific database 130 (e.g., database) implementation. Thus, the developer calling these method(s) does not need to know the database 130 (e.g., database) provider types for parameters. Additionally, optionally, the method signature resolves impedance mismatches between Database Nullable types and common language nullable types. Rather than having to pass common language runtime representations of database null values, for example DBNull, the developer can simply pass the language's representation of Null directly to the method.

Accordingly, the consumer of a database 130 does not have to deal with the database 130 directly. Further, the consumer of the database 130 is not responsible for object conversation(s) and/or casting. Thus, change(s) to a query and/or interface of the database 130 can be accomplished in the typed data adapter. For example, a consumer (e.g., developer) can utilize substantially the same object for stateful operation(s) (e.g., database operation(s)) and/or stateless operation(s) (e.g., web operation(s)). In accordance with an aspect of the subject invention, the data access component(s) 120 can be implemented as base class(e) that can be extended with inheritance and/or partial class(es), for example, by a developer. Further, consumption of the type data adapter(s) can be accomplished by any managed language (e.g., Visual Basic, C#).

Another aspect of the subject invention provides for the developer to alter code generated by the system 100, for example, the data access component 120. Thus, the developer can extend the generated class without using inheritance. For example, a developer can be provided with the ability to additional code to the generated type (e.g., Partial Types). In this example, the combination of designer support, with partial class extensibility enables a balance of rapid application development (RAD) tools without limiting the developer's generated code to features supported in the designer.

Yet another aspect of the subject invention provides for developer(s) to change the base class the data access component 120 inherits from, thus enabling the developer to add functionality common to a plurality of typed data adapters 120.

Typed Data Adapter Property

In one example, the data access component 120 further exposes a property (e.g., DataAdapter) which when read, initializes commands on the data access component 120.

Nullable Types

For example, the system 100 can support database null as a value of parameter(s) with support for compile-time checking of calls to the data access component 120. Further, the system 100 can allow null(s) to be passed to the method with the method converting null(s) to the database specific definition of null (e.g., DBnull). Finally, the system 100 can facilitate providing a model that works across various languages.

For example, for the Microsoft NET framework, Nullable (OfT) is the model for handling nullable value types. In one example, the specific language is unaware of Nullable(Of T) so the data access component 120 can't just pass the parameter passed in to the method directly to the Parameter object. For languages that do support Nullable(OfT) types, the data access component 120 performs a conversion of Nullable(Of T) to Null/Nothing. For example For each parameter that was declared as Nullable, the data access component 120 generates the DBNull conversion.

For each Ref type, the data access component 120 checks for null and does the conversion For each column that was specified as AllowDBNull=false, an ArguementNullException can be thrown with the name of the specified column.

In this example, for each parameter that supports Nullable(Of T), the data access configuration component 110 generates the following code:

TABLE 5

If Original__CustomerID.HasValue Then
   Me.DeleteCommand.Parameters(0).Value =
   Original__CustomerID.Value
Else
   Me.DeleteCommand.Parameters(0).Value = System.Convert.DBNull
End If Further, languages that do not support generics simply follow the next scenario and compare to nothing. If the parameter doesn't support Nullable(OfT), either because it's a reference type, or because AllowDBNull=False, the data access configuration component 110 generates the following code:

TABLE 6

If Original__CustomerName = Nothing Then
   Me.DeleteCommand.Parameters(0).Value = System.Convert.DBNull
Else
   Me.DeleteCommand.Parameters(0).Value = Original__CustomerName
End If For any column that was specified as AllowDBNull=False, the system 100 can throw an ArgumentNullException when the parameter is null/nothing. For example:

TABLE 7

If DateAccountOpened = Nothing Then
   Throw New ArgumentNullException("DateAccountOpened")
Else
   Me.InsertCommand.Parameters(4).Value = DateAccountOpened
End If For example:

TABLE 8

| Column | DataType | AllowDBNull |
|---|---|---|
| CustomerId | Int | False |
| CustomerName | String | False |
| ContactName | String | True |
| DateAccountClosed | DateTime | True |
| DateAccountOpened | DateTime | False |

The data access configuration component 110 can generate the following code:

TABLE 9

Public Function Insert(CustomerId As Integer, CustomerName As String, ContactName As String, DateAccountOpened As DateTime, DateAccountClosed As Nullable(Of DateTime)) As Integer
   If CustomerId = Nothing Then
      Throw New ArgumentNullException("CustomerId")
   Else
      Me.InsertCommand.Parameters(0).Value = CustomerId
   End If
   If CustomerName = Nothing Then
      Throw New ArgumentNullException("CustomerName")
   Else
      Me.InsertCommand.Parameters(1).Value = CustomerName
   End If
   If ContactName = Nothing Then
      Me.InsertCommand.Parameters(2).Value = System.Convert.DBNull
   Else
      Me.InsertCommand.Parameters(2).Value = ContactName
   End If
   If DateAccountOpened = Nothing Then
      Throw New ArgumentNullException("DateAccountOpened")
   Else
      Me.InsertCommand.Parameters(4).Value = DateAccountOpened
   End If
   If DateAccountClosed.HasValue Then
      Me.InsertCommand.Parameters(3).Value =
      DateAccountClosed.Value
   Else
      Me.InsertCommand.Parameters(3).Value = System.Convert.DBNull
   End If
   Try
      Me.InsertCommand.Connection.Open( )
      Return Me.InsertCommand.ExecuteNonQuery
   Finally
      Me.InsertCommand.Connection.Close( )
   End Try
End Function Nullable Parameters for Queries In one example, in order to provide flexibility, safe and simplified defaults, the data access configuration component 110 (e.g., TableAdapter wizard) can support Nullable(Of T) for query parameters. For example:

- As the data access configuration component 110 does for the stateless methods, the data access configuration component 110 can convert Null to DBNull.
- If a parameter is defined as not supporting null, but is a Ref type, the data access configuration component 110 can throw an ArgumentNullException.
- The data access configuration component 110 can leverage the information from the database 130 regarding the null support as defined on individual column(s) in the database for the default null/throw behavior. If AllowDBNull=false, the data access configuration component 110 can throw an ArguementNullException
- If the type is a Ref Type, the data access configuration component 110 does not generate annullable parameter, however the data access configuration component 110 can still convert Null to DBNull.
- The user can change whether a parameter supports Null by changing it within the parameters collection in the Property Grid. In one example, the code generated by the data access configuration component 110 is based on the Parameter.AllowDbNull value.

Default of AllowDBNull for Stateless Method(s)

In one example, when the parameter is created, the data access configuration component 110 will use the AllowDbNull value of a particular column, if the column can be resolved for the parameter.

It is to be appreciated that the system 100, the data access configuration component 110, the data access component 120, the database 130, the application 140, the system 200 and/or the data set 210 can be computer components as that term is defined herein.

Figure 3:
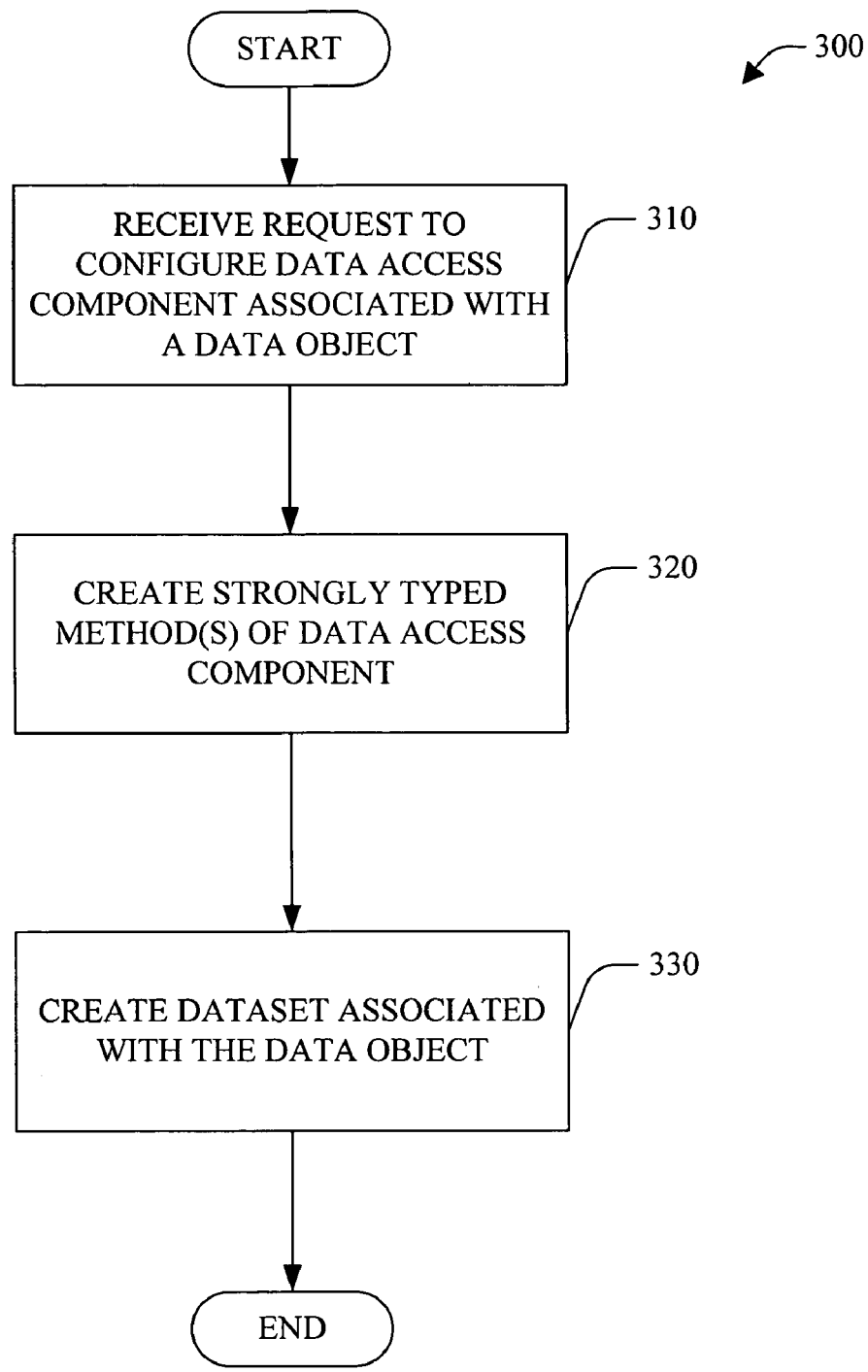
FIG. 3 is a flow chart of a method of facilitating data access in accordance with an aspect of the subject invention.
Figure 4:
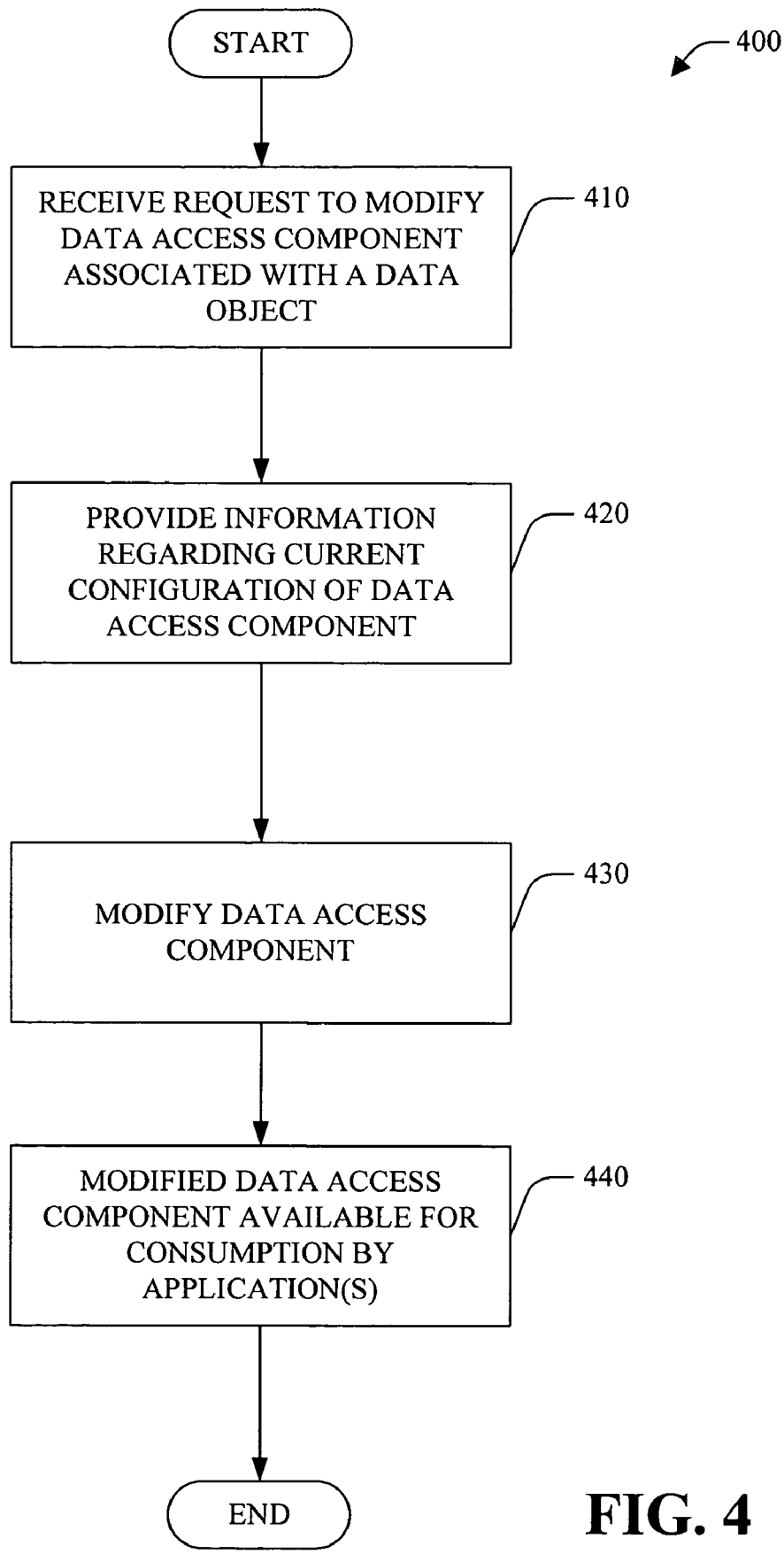
FIG. 4 is a flow chart of a method of modifying a data access component in accordance with an aspect of the subject invention.

Turning briefly to FIGS. 3 and 4, methodologies that may be implemented in accordance with the subject invention are illustrated. While, for purposes of simplicity of explanation, the methodologies are shown and described as a series of blocks, it is to be understood and appreciated that the subject invention is not limited by the order of the blocks, as some blocks may, in accordance with the subject invention, occur in different orders and/or concurrently with other blocks from that shown and described herein. Moreover, not all illustrated blocks may be required to implement the methodologies in accordance with the subject invention.

The subject invention may be described in the general context of computer-executable instructions, such as program modules, executed by one or more components. Generally, program modules include routines, programs, objects, data structures, etc. that perform particular tasks or implement particular abstract data types. Typically the functionality of the program modules may be combined or distributed as desired in various embodiments.

Referring to FIG. 3, a method of facilitating data access in accordance with an aspect of the subject invention is illustrated. At 310, a request to configure a typed data adapter associated with a data object (e.g., database) is received. For example, the request can be received by a data access configuration component 110. At 320, strongly typed method(s) of the typed data adapter are created. For example, the method(s) can implement and expose public method(s) for the "Fill" and "Update" methods normally found on a data adapter. At 330, a data set associated with the data object (e.g., database) is created.

Next, turning to FIG. 4, a method of modifying a data access component in accordance with an aspect of the subject invention is illustrated. At 410, a request to modify a data access component associated with a data object is received. At 420, information regarding a current configuration of the data access component is provided, for example, to a developer. At 430, the data access component is modified based, for example, upon information received from the developer. At 440, the modified data access component is available for consumption by application(s).

Figure 5:
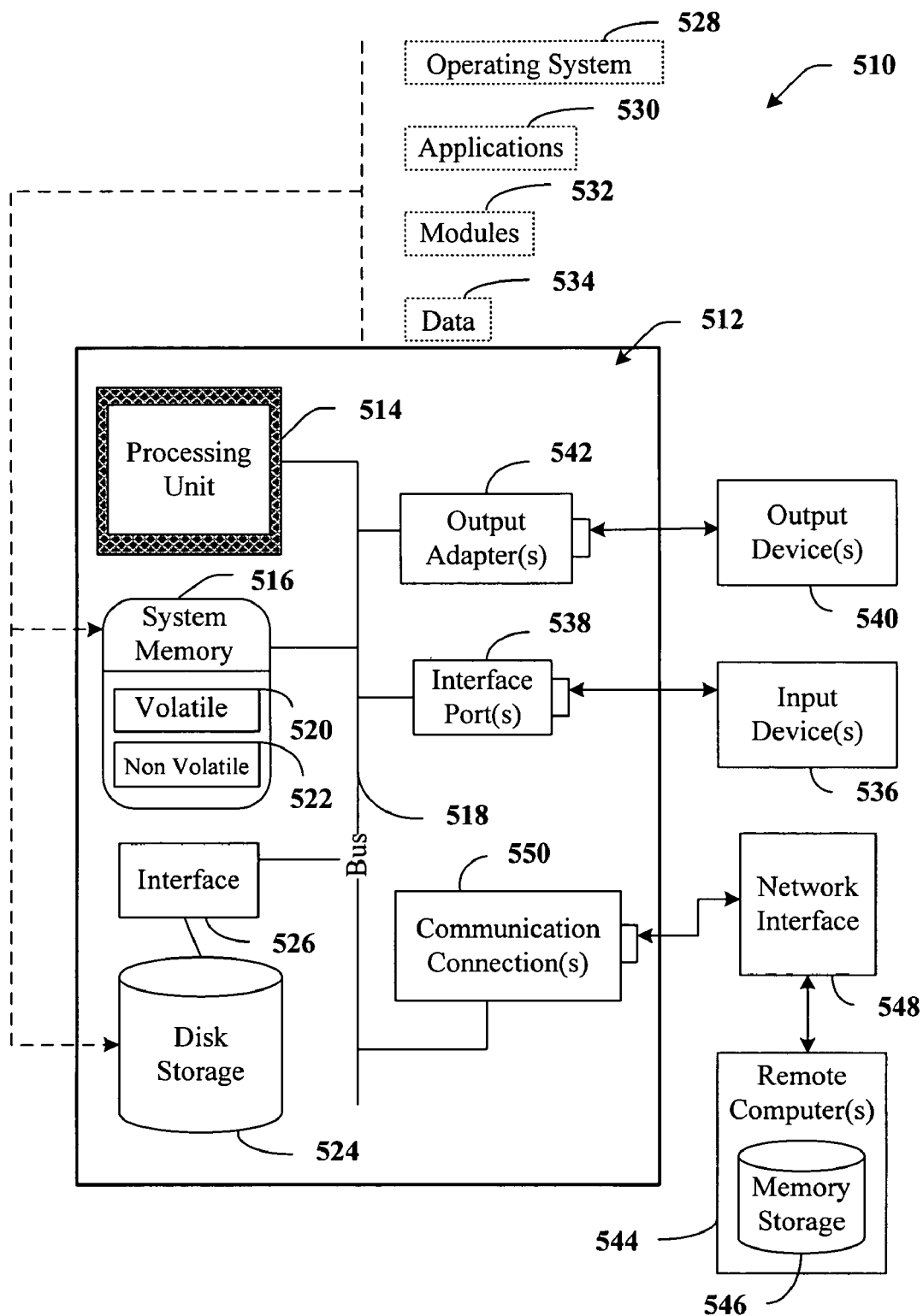
FIG. 5 illustrates an example operating environment in which the invention may function.

In order to provide additional context for various aspects of the subject invention, FIG. 5 and the following discussion are intended to provide a brief, general description of a suitable operating environment 510 in which various aspects of the subject invention may be implemented. While the subject invention is described in the general context of computer-executable instructions, such as program modules, executed by one or more computers or other devices, those skilled in the art will recognize that the subject invention can also be implemented in combination with other program modules and/or as a combination of hardware and software. Generally, however, program modules include routines, programs, objects, components, data structures, etc. that perform particular tasks or implement particular data types. The operating environment 510 is only one example of a suitable operating environment and is not intended to suggest any limitation as to the scope of use or functionality of the subject invention. Other well known computer systems, environments, and/or configurations that may be suitable for use with the subject invention include but are not limited to, personal computers, hand-held or laptop devices, multiprocessor systems, microprocessor-based systems, programmable consumer electronics, network PCs, minicomputers, mainframe computers, distributed computing environments that include the above systems or devices, and the like.

With reference to FIG. 5, an exemplary environment 510 for implementing various aspects of the subject invention includes a computer 512. The computer 512 includes a processing unit 514, a system memory 516, and a system bus 518. The system bus 518 couples system components including, but not limited to, the system memory 516 to the processing unit 514. The processing unit 514 can be any of various available processors. Dual microprocessors and other multiprocessor architectures also can be employed as the processing unit 514.

The system bus 518 can be any of several types of bus structure(s) including the memory bus or memory controller, a peripheral bus or external bus, and/or a local bus using any variety of available bus architectures including, but not limited to, an 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 516 includes volatile memory 520 and nonvolatile memory 522. The basic input/output system (BIOS), containing the basic routines to transfer information between elements within the computer 512, such as during start-up, is stored in nonvolatile memory 522. By way of illustration, and not limitation, nonvolatile memory 522 can include read only memory (ROM), programmable ROM (PROM), electrically programmable ROM (EPROM), electrically erasable ROM (EEPROM), or flash memory. Volatile memory 520 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 512 also includes removable/nonremovable, volatile/nonvolatile computer storage media. FIG. 5 illustrates, for example a disk storage 524. Disk storage 524 includes, but is not limited to, devices like a magnetic disk drive, floppy disk drive, tape drive, Jaz drive, Zip drive, LS-100 drive, flash memory card, or memory stick. In addition, disk storage 524 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 524 to the system bus 518, a removable or non-removable interface is typically used such as interface 526.

It is to be appreciated that FIG. 5 describes software that acts as an intermediary between users and the basic computer resources described in suitable operating environment 510. Such software includes an operating system 528. Operating system 528, which can be stored on disk storage 524, acts to control and allocate resources of the computer system 512. System applications 530 take advantage of the management of resources by operating system 528 through program modules 532 and program data 534 stored either in system memory 516 or on disk storage 524. It is to be appreciated that the subject invention can be implemented with various operating systems or combinations of operating systems.

A user enters commands or information into the computer 512 through input device(s) 536. Input devices 536 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 514 through the system bus 518 via interface port(s) 538. Interface port(s) 538 include, for example, a serial port, a parallel port, a game port, and a universal serial bus (USB). Output device(s) 540 use some of the same type of ports as input device(s) 536. Thus, for example, a USB port may be used to provide input to computer 512, and to output information from computer 512 to an output device 540. Output adapter 542 is provided to illustrate that there are some output devices 540 like monitors, speakers, and printers among other output devices 540 that require special adapters. The output adapters 542 include, by way of illustration and not limitation, video and sound cards that provide a means of connection between the output device 540 and the system bus 518. It should be noted that other devices and/or systems of devices provide both input and output capabilities such as remote computer(s) 544.

Computer 512 can operate in a networked environment using logical connections to one or more remote computers, such as remote computer(s) 544. The remote computer(s) 544 can be a personal computer, a server, a router, a network PC, a workstation, a microprocessor based appliance, a peer device or other common network node and the like, and typically includes many or all of the elements described relative to computer 512. For purposes of brevity, only a memory storage device 546 is illustrated with remote computer(s) 544. Remote computer(s) 544 is logically connected to computer 512 through a network interface 548 and then physically connected via communication connection 550. Network interface 548 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 550 refers to the hardware/software employed to connect the network interface 548 to the bus 518. While communication connection 550 is shown for illustrative clarity inside computer 512, it can also be external to computer 512. The hardware/software necessary for connection to the network interface 548 includes, for exemplary purposes only, internal and external technologies such as, modems including regular telephone grade modems, cable modems and DSL modems, ISDN adapters, and Ethernet cards.

What has been described above includes examples of the subject invention. It is, of course, not possible to describe every conceivable combination of components or methodologies for purposes of describing the subject invention, but one of ordinary skill in the art may recognize that many further combinations and permutations of the subject invention are possible. Accordingly, the subject invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer implemented system that facilitates data access comprising:
    a data access component that facilitates access to a data object by an application, the current configuration of the data access component provided to a developer for modification of the data access component, the data access component is instanced on multiple forms components with the developer's own class;
    a data access configuration component that configures the data access component, the configured data access component is employed at design-time to facilitate access to one or more data objects, wherein the data access component comprises an object that includes one or more queries, and wherein for each query, the data access component exposes a wrapped method generated by the data access configuration component by which the query is executed, wherein the wrapped method accepts parameters of a specific type that are converted to an appropriate type for the query and encapsulated in the data access component such that a developer need not know the appropriate type to specify the parameters, and wherein the data access configuration component provides a mapping between database types and common language runtime data types including the impedance mismatch of null representations such that nulls of the common language runtime data types are passed to the wrapped method for each query where they are converted to a database specific definition of null; and
    a processor coupled to a memory that implements the data access configuration component.

2. The system of claim 1, the data object comprising a database.

3. The system of claim 1, the data object comprising a DataSet.

4. The system of claim 1, wherein the one or more queries comprises one or more SQL statements or one or more stored procedures.

5. The system of claim 4, the data access configuration component at least one of creates or configures parameters for the one or more SQL statements or one or more stored procedures so that commands read or write correct data.

6. The system of claim 1, the data access configuration component comprising a data component query configuration wizard to create and/or edit a query of the type Data Adapter.

7. The system of claim 1, the data access configuration component configures the data access component with a strongly typedwherein the wrapped method is used to fill a data table associated with the data object.

8. The system of claim 1, the configured data access component facilitates communication between the application and the data object.

9. The system of claim 1, the data access component encapsulates a single configured data adapter and zero, one or more commands that at least one of retrieve or update data based on a common schema.

10. The system of claim 1, the developer can extend the generated class without using inheritance.

11. The system of claim 1, the developer changes the base class the data access component inherits from to add functionality common to a plurality of typed data adapters.

12. The system of claim 1, the configured data access component comprising at least one of a Fill, a FillPage, a GetData, a FillflyCategoryName, a GetflyCategoryName, an Insert and an Update function.

13. The system of claim 1, the configured data access component providing information associated with an event to the application.

14. A method of facilitating data access comprising:
providing current configuration information of a data access component to a user for modification of the data access component;
generating code for a strongly typed method of the data access component facilitating access by an application to a data object of a database, the data access component comprises an object that exposes a wrapped method generated by a data access configuration component and a query, wherein the wrapped method provides an interface by which the query is executed, wherein the wrapped method accepts parameters of a specific type that are converted to an appropriate type for the query such that a developer need not know the appropriate type to specify the parameters;
creating a DataSet associated with the data object;
encapsulating a communication between the application and at least one of the database or the DataSet;
providing a mapping between database types and common language runtime data types including the impedance mismatch of null representations; and
allowing nulls to be passed to the one or more named methods, the one or more named methods converting nulls to a database specific definition of null.

15. The method of claim 14, the strongly typed method comprising at least one of a Fill, a FillPage, a GetData, a FillflyCategoryName, a GetflyCategoryName, an Insert and an Update function.

16. A computer readable medium storing components of a system that facilitates data access comprising:
a data access component that facilitates access to a data object by an application, the current configuration of the data access component provided to a developer for modification of the data access component, the data access component is instanced on multiple forms components with the developer's own class; and
a data access configuration component that configures the data access component, the configured data access component is employed at design-time to facilitate access to one or more data objects, wherein the data access component comprises an object that includes one or more queries, and wherein for each query, the data access component exposes a wrapped method generated by the data access configuration component by which the query is executed, wherein the wrapped method accepts parameters of a specific type that are converted to an appropriate type for the query and encapsulated in the data access component such that a developer need not know the appropriate type to specify the parameters, and wherein the data access configuration component provides a mapping between database types and common language runtime data types including the impedance mismatch of null representations such that nulls of the common language runtime data types are passed to the wrapped method for each query where they are converted to a database specific definition of null;
wherein a memory operatively coupled to a processor retains at least one of the data access component or the data access configuration component.

* * * * *

UNITED STATES PATENT AND TRADEMARK OFFICE
CERTIFICATE OF CORRECTION

PATENT NO.         : 7,711,740 B2
APPLICATION NO.    : 10/968734
DATED              : May 4, 2010
INVENTOR(S)        : Lorenzo Minore et al.

It is certified that error appears in the above-identified patent and that said Letters Patent is hereby corrected as shown below:

In column 11, lines 13-16, in Claim 7, after "claim 1," delete "the data access configuration component configures the data access component with a strongly typedwherein the wrapped method is used to fill a data table associated with the data object." and
insert -- wherein the wrapped method is used to fill a data table associated with the data object. --, therefor.

In column 11, line 32, in Claim 12, delete "FillflyCategoryName," and
insert -- FillByCategoryName, --, therefor.

In column 11, line 32, in Claim 12, delete "GetflyCategoryName," and
insert -- GetByCategoryName, --, therefor.

In column 12, line 15, in Claim 15, delete "FillflyCategoryName," and
insert -- FillByCategoryName, --, therefor.

In column 12, line 15, in Claim 15, delete "GetflyCategoryName," and
insert -- GetByCategoryName, --, therefor.

Signed and Sealed this
Twenty-fourth Day of May, 2011

David J. Kappos
*Director of the United States Patent and Trademark Office*